: 3,296,258
7-(IMIDAZOLIDINYL-BUTYRYL)-AMINO-CEPHALOSPORANIC ACIDS

Ernst Vischer, Basel, Bruno Fechtig and Hans Bickel, Binningen, and Rolf Bosshardt and Jakob Urech, Basel, Switzerland, assignors to Ciba Corporation, New York, N.Y., a corporation of Delaware
No Drawing. Filed Aug. 5, 1964, Ser. No. 387,802
Claims priority, application Switzerland, July 25, 1961, 8,762/61; Dec. 22, 1961, 14,842/61; June 22, 1962, 7,536/62; Nov. 12, 1962, 13,208/62; Aug. 20, 1963, 10,279/63
4 Claims. (Cl. 260—243)

This is a continuation-in-part application of our application Serial No. 323,068, filed November 12, 1963, which is itself a continuation-in-part of application Serial No. 212,314, filed July 25, 1962, by Ernst Vischer, Bruno Fechtig and Hans Bickel.

The present invention relates to therpeutically active derivatives of cephalosporin C of the formula

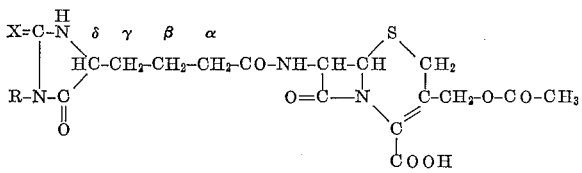

in which R is a member selected from the group consisting of lower alkyl, lower alkenyl, phenyl, lower alkylphenyl, nitrophenyl, halophenyl, naphthyl, and halonaphthyl and X represents a member selected from the group consisting of oxygen and sulfur and to salts of these compounds.

The salts of the new derivatives are either metal salts or salts with organic tertiary nitrogen bases as for instance triethylamine, N-ethylpiperidine, dibenzylethylenediamine or procaine.

Metal salts are advantageously such of therapeutically useful alkali metals or alkaline earth metals, such as sodium, potassium or calcium.

The new compounds of Formula I and their salts have a high antibiotic activity against various microorganisms, especially gram-positive bacteria. Therefore they can be used as medicaments in human and veterinary medicine. They are also useful as additives to feedstuffs or as disinfectants. As compared with natural or semi synthetic penicillins they have the advantage of being useful even when penicillin-allergy is observed. Particularly valuable are 7-[4-(1-allyl-2-thiono-5-oxo-imidazolidine-4-yl)-butyryl]-amino - cephalosporanic acid, 7-[4-(1-phenyl-2-thiono - 5 - oxo-imidazolidine-4-yl) - butyryl] - amino-cephalosporanic acid and 7-[4-(1-phenyl - 2:5 - dioxo-imidazolidine-4-yl)-butyryl] - amino-cephalosporanic acid and their salts. If dilution series (powers of two) in glucose broth which are incubated for 24 hours at 37° C. are used as test method in vitro, the following inhibiting concentrations are obtained with 7-[4-(1-allyl - 2 - thiono-5-oxo-imidazolidine - 4 - yl)-butyryl] - amino- cephalosporanic acid:

| Microorganism | Inhibiting concentration µg/ml |
|---|---|
| Staph. aureus, sensitive to penicillin (strain Smith) | 0.8 |
| Staph. aureus, resistant to penicilline G (strain 2999) | 6.0 |
| Staph. aureus polyresistant (strain 2977) | 6.0 |
| Streptococcus pyogenes (strain A 38) | 1.0 |

The antibiotic is also active in vivo. When 50 mice infected either with Staph. aureus, strain Smith or Staph. aureus, resistant to penicillin G (strain 2999), were given subcutaneous injections of 5 mg. of the antibiotic per kilogram of body weight five times within 30 hours, 50% of survivals were observed; without injection of the antibiotic all the mice died within 48 hours. When 50 mice infected with Staph. aureus, strain Smith, were given 6 times within 6 days 100 mg. each time p.o. of the antibiotic per kilogram of body weight, 50% of survivals were observed; without administration of the antibiotic all the mice died wthin 48 hours.

These data are statistically significant at the 1% level. The toxicity of the antibiotic is low. Doses of 1000 mg./kg. p.o. or of 300 mg./kg. s.c. were tolerated by non-infected mice without any harm.

In the above tests the antibiotic has, in a direct comparison, approximately the same activity against staphylococci sensitive or resistant to penicillin G or against streptococci as commercial products of the penicillin-series, for instance the sodium-salt of 6-(2,6-dimethoxy-benzoyl - amido) - penicillanic acid. It can therefore be administrated in the same manner, especially in persons with penicillin-allergies.

The new compounds are obtained by reacting cephalosporin C with an isocyanic acid ester or isothiocyanic acid ester of the formula RN=C=X where R has the meaning given above and X is oxygen or sulfur and effecting ring closure by means of a weak acid, above all glacial acetic acid. Surprisingly, ring closure of the first formed ureido or thioureido compound to form the hydantoin or thiohydantoin ring, respectively, takes place even in weakly acid medium; no splitting of the molecule, for example at the lactam bond, occurs.

The ring-closure to form the hydantoin or thiohydantoin compound may be carried out in the same reaction medium as the condensation of the cephalosporin with the isocyanic or thiocyanic acid ester. Alternatively, the carbamic or thiocarbamic acid derivative occurring as intermediate product may be isolated and ring-closure performed subsequently.

Hitherto, a comparably antibacterial activity has been achieved only by means of semisynthetic cephalosporins which are obtained via 7-amino-cephalosporanic acid as intermediate. 7-amino-cephalosporanic acid is prepared by splitting cephalosporin C, a process difficult to carry out and giving only poor yields. In contrast, the present process is simple and gives the new cephalosporins in good yield.

The new compounds may be used as medicaments, for example in the form of pharmaceutical preparations which contain the compounds or their salts in admixture or conjunction with a pharmaceutical organic or inorganic, solid or liquid carrier suitable for enteral, topical or parenteral administration. Suitable carriers are substances that do not react with the new compounds, for example water, gelatin, lactose, starches, stearyl alcohol, magnesium stearate, talc, vegetable oils, benzyl alcohols, gums, propylene glycol, polyalkylene glycols, white petroleum jelly, cholesterol or any other known medicinal carrier. The pharmaceutical preparations may be in the form, for example, of tablets, dragees, ointments, creams, capsules or in liquid form as solutions, suspensions or emulsions. They may be sterilised and/or contain auxiliaries, for example preserving, wetting or emulsifying agents, solution promoters or salts for modifying the osmotic pressure or buffers. They may also contain other therapeutically useful substances. The preparations are obtained by the conventional methods.

The following examples illustrate the invention without limiting it thereto.

*Example 1*

20 grams of cephalosporin C are dissolved in 500 cc. of N-sodium bicarbonate, treated with 200 cc. of acetone and then treated at 40° C. slowly and with vigorous stirring with a solution of 7.5 cc. of phenyl isothiocyanate in 200 cc. of acetone. After the reaction mixture has been stirred for 2 hours at 40° C., the acetone is evaporated under reduced pressure, the remaining aqueous phase is adjusted to pH 5.0 with phosphoric acid of 80% strength, extracted five times with 200 cc. of benzene each time (evaporation residue of the benzene extract dried with sodium sulfate: 499 mg.). The aqueous solution further acidified to pH 2.0 with phosphoric acid is finally extracted four times with 300 cc. of ethyl phosphoric acid of 1% strength and dried over sodium sulfate to yield 22.29 grams of residue. In the plate test it shows the following inhibition zones:

|  | Staph. aureus (sensitive to penicillin G), mm. | Staph. aureus (resistant to penicillin G), mm. | Bac. subtilis, mm. |
| --- | --- | --- | --- |
| 1% solution | 25 | 21 | 30 |
| 0.1% solution | 18 | 16 | 21 |
| 0.01% solution | 10 | 9 | 10 | and, according to the paper chromatogram (system: n-butanol-methanol-water 2:1:2, biautographed with Staphylococcus aureus) consists of a mixture of N-(N'-phenyl-thiocarbamyl)-cephalosporin C of the formula

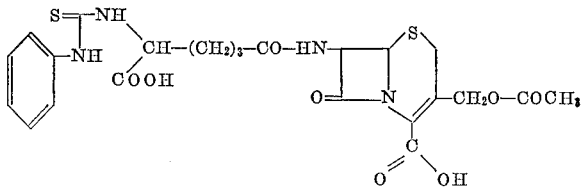

(R$f$=0.68; strong spot) and 7-[4-(1-phenyl)-2-thiono-5-oxo-imidazolidine-4-yl) - butyryl]-amino-cephalosporanic acid (PTH-cephalosporin C) of the formula

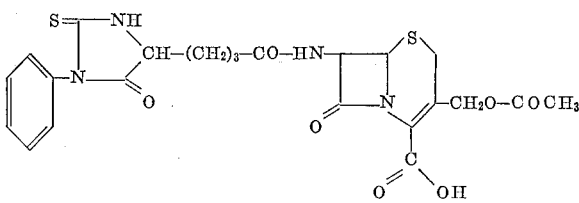

(R$f$=0.78; weak spot).

The mixture is converted into the unitary imidazolidine derivative by acidic treatment as follows:

107 mg. of the mixture are dissolved in 5 cc. of glacial acetic acid and heated for 21 hours at 40° C. The reaction mixture is then evaporated under 0.1 mm. pressure of mercury and the remaining acetic acid removed by taking up the residue in a mixture of toluene and alcohol (2:1) and renewed evaporation to yield 95.6 mg. of paper-chromatographically unitary, crude 7-[4-(1-phenyl)-2-thiono-5-oxo-imidazolidine-4-yl) - butyryl]-amino-cephalosporanic acid.

Inhibition zones in the plate test:

|  | Staph. aureus (sensitive to penicillin G), mm. | Staph. aureus (resistant to penicillin G), mm. | Bac. subtilis, mm. |
| --- | --- | --- | --- |
| 0.1% solution | 20 | 18 | 24 |
| 0.01% solution | 12 | 11 | 13 |

In the dilution test the following inhibition concentrations are found:

|  | Staph. aureus (sensitive to penicillin G), γ/ml. | Staph. aureus (resistant to penicillin G), γ/ml. |
| --- | --- | --- |
| Mixture of substances before acidic treatment | 16 | 16 |
| PTH-cephalosporin C after acidic treatment | 8 | 16 |
| Cephalosporin C | 125 | 125 |

The substance may be further purified by chromatography on silica gel and crystallized from acetone, melting point 138° (dec.).

*Example 2*

A solution of 15 grams of cephalosporin C in 150 ml. of water and 150 ml. of pyridine (at pH 7.5) is heated to 37° C. and mixed with 11.9 ml. of N-sodium hydroxide solution (at pH 9.0). 7.5 ml. of phenyl isothiocyanate are then added, while keeping the temperature (37° C.) and the pH value (9) constant by dropping in N-sodium hydroxide solution, of which 60% of the calculated amount are consumed within the first 10 minutes. After 70 minutes, 71% of the theoretical amount of sodium hydroxide solution has been consumed. The mixture is diluted with 400 ml. of water and agitated 3 times with 1 liter of benzene on each occasion and once with 500 ml. of ether. The aqueous phase is then adjusted to pH 1.7 with concentrated hydrochloric acid, the precipitate being dissolved by adding 600 ml. of dioxane, and the whole is left to itself for 2½ hours at 22° C. The solution is slightly concentrated under vacuum and then again diluted with water and exhaustively extracted with ethyl acetate. The extracts are washed with saturated sodium chloride solution, dried over sodium sulfate and evaporated to yield 17.07 grams of residue. The colorless, amorphous 7-[4-(1-phenyl-2-thiono-5-oxo-imidazolidine-4-yl)butyryl]-amino-cephalosporanic acid is revealed by its paper-chromatogram (after bioautographic development with *Staphylococcus aureus*) to be unitary and has in the system n-butanol:methanol:water (2:1:2) and R$f$ value of 0.68, and in the system n-butanol (saturated with water) glacial acetic acid (98:2) an R$f$ value of 0.41. Inhibition zones of 1% solutions in acetone on paper roundels of 6 mm. diameter: *Staphylococcus aureus*, 24 mm.; *Bacillus subtilis*, 30 mm.; *Staphylococcus aureus*, resistant to penicillin, 21 mm.

Example 3

A solution of 473 mg. of the sodium salt of cephalosporin C in 10 ml. of N-sodium bicarbonate solution is mixed with 4 ml. of acetone, and a solution of 155 mg. of phenylisocyanate in 4 ml. of acetone is then slowly stirred in. The whole is stirred for 2 hours at 40° C. and the acetone is then evaporated under vacuum. The aqueous phase is diluted with 30 ml. of water and adjusted with phosphoric acid to pH=2.0, and then extracted with ethyl acetate. The extract is dried over sodium sulfate and evaporated, to yield 54 mg. of crude N-(phenylcarbamyl)-cephalosporin C of the formula

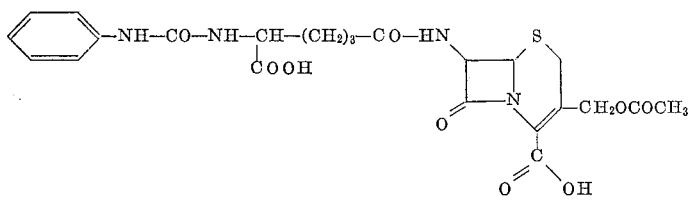

Paperchromatogram in the system n-butanol+methanol+water (2:1:): R$f$ value 0.69 (bioautographed with Stahpyloccus aureus).

For conversion into the cyclic product a solution of 410 mg. of N-(N'-phenylcarbamyl) cephalosporin C in 25 ml. of glacial acetic acid is left to itself for 18 hours at 40° C.

The evaporation residue of the crude product (398 mg.) is purified by being taken up in chloroform+acetone (2:1) and stirred with 200 mg. of animal carbon. The evaporated filtrate contains 332 mg. of 7-[4-(1-phenyl-2:5-dioxo-imidazolidin-4-yl)-butyrl[ - amino - cephalosporanic acid of the formula

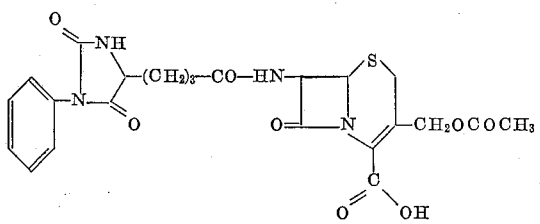

Paperchromatogram in the system n-butanol+methanol+water (2:1:2) R$f$ value 0.78 (bioautographed with Staphylococcus aureus).

Ultraviolet absorption spectrum in 0.1 N-sodium bicarbonate solution: $\lambda_{max}$=263 m$\mu$, $\epsilon$=19,900.

Inhibiting concentration towards Staphylococcus aureus (sensitive to penicillin G) in vitro: 3.2$\gamma$ per ml.

Inhibiting concentration towards Staphylococcus aureus (resistant to penicillin G) in vitro: 12.5$\gamma$ per ml.

Example 4

A solution of 1 g. of the sodium salt of cephalosporin C in 20 ml. of N-sodium bicarbonate solution is mixed with 6 ml. of acetone, and a solution of 0.4 ml. of $\alpha$-naphthyl-isocyanate in 10 ml. of acetone is then slowly stirred in. The reaction is conducted and the reaction product worked up as described in Example 1. Yield: 1.27 g. of crude N-(naphthylcarbamyl)-cephalosporin C of the formula

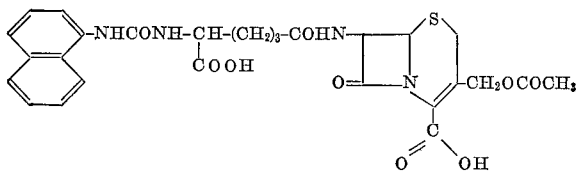

It is converted into the cyclic product by being treated with glacial acetic acid for 18 hours at 22° C. Yield: 1.198 g. of 7-[4-(1-naphthyl-2:5 - dioxo - imidazolidin-4 - yl)-butyryl] - amino - cephalosporanic acid of the formula

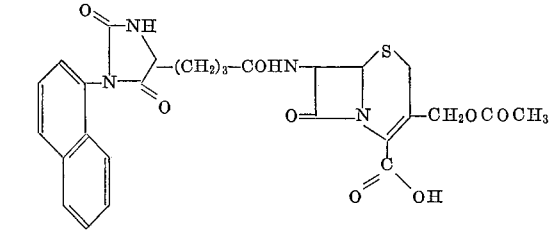

Thin-layer chromatogram on silica gel in the system n-butanol+glacial acetic acid (10:1) saturated with water:

R$f$ value 0.40 (developed according to R. Thomas, Nature 191, page 1161 [1961]). Ultraviolet absorption spectrum in 0.1 N-sodium bicarbonate solution: $\lambda_{max}$=271 m$\mu$, $\epsilon$=11,000.

Inhibiting concentration towards Staphylococcus aureus (sensitive to pencillin G): 6.4$\gamma$ per ml., towards Staphylococcus aureus (resistant to penicillin G): 12.6$\gamma$ per ml.

Example 5

A solution of 2 g. of the barium salt of cephalosporin C in 40 ml. of N-sodium bicarbonate solution is mixed with 12 ml. of acetone, and a solution of 0.5 ml. of n-butylisocyanate in 20 ml. of acetone is then slowly stirred in. The reaction is performed as described in Example 1; the aqueous phase is freed from acetone, saturated with sodium chloride, and extrated at pH=2.0 with butanol+ethyl acetate (1:1). When the extract is dried and evaporated, it yields 1:57 g. of crude N-(n-butyl-carbamyl)-cephalosporin C of the formula

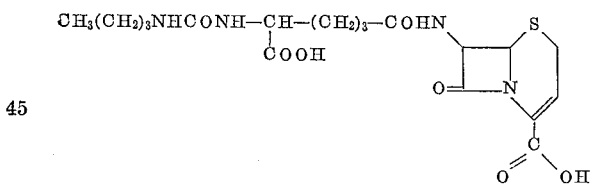

Paperchromatogram in the system n - butanol+methanol+water (4:1:2): R$f$ value 0.47 (bioautographed with Staphylococcus aureus).

The product is dissolved in 50 ml. of glacial acetic acid and left to itself for 17 hours at 24° C. and then evaporated, to yield 1.43 g. of 7-[4-(1 - n - butyl-2:5-dioxo-imidazolidin - 4 - yl)-butyryl] - amino - cephalosporanic acid of the formula

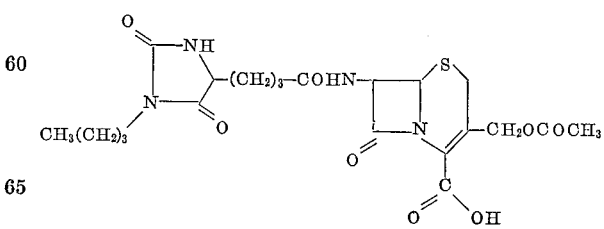

Paperchromatogram in the system n-butanol+methanol +water (4:1:2): R$f$ value 0.62 (bioautographed with Staphylococcus aureus). The infared absorption spectrum in Nujol contains bands, inter alia, at 3.00, 5.59, 5.81, 6.00, 6.49, 7.65, 8.02, 8.38 (shoulder), 8.64 (shoulder), 8.98, 9.36, 9.69, 9.98 and 13.10$\mu$.

The inhibiting concentration towards Staphylococcus aureus (sensitive to penicillin G) is 6.4$\gamma$ per ml., and towards *Staphylococcus aureus* (resistant to penicillin G) it is 12.6γ per ml.

*Example 6*

15 grams of the barium salt of cephalosporin C of about 60% purity are dissolved in 300 ml. of water and treated with stirring at 40° C. with a solution of 4 grams of sodium sulfate in 50 ml. of water. After stirring the batch for 15 minutes at 40° C., the precipitated barium sulfate is filtered off. The filtrate, which now, together with the washing water has a volume of about 400 ml., is treated with 40 grams of sodium bicarbonate and 250 ml. of acetone and then with a solution of 4.5 ml. of allyl isothiocyanate in 70 ml. of acetone in the course of half an hour at 40° C. with stirring. The batch is then stirred for 3½ hours at 40° C. and the acetone evaporated in vacuo. The remaining aqueous phase is washed with ethyl acetate, its pH value adusted to 2.0 with phosphoric acid and, after being saturated with sodium chloride, extracted with ethyl acetate. The ethyl acetate solution is dried over sodium sulfate and evaporated in vacuo to yield 8.47 grams of crude allythioureido compound of the formula

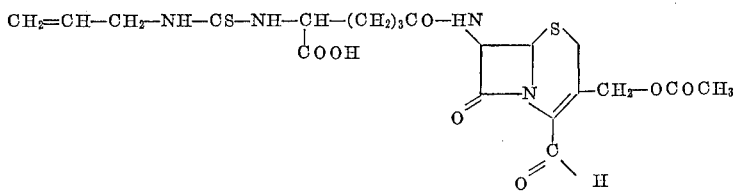

Ultraviolet spectrum in alcohol: $\lambda_{max}$ 244 ($\epsilon$=13300). Thin-layer chromatogram on silica gel in the system n-butanol+glacial acetic acid (10:1) saturated with water: $Rf$=0.27 (developed with iodine starch reagent according to R. Thomas, Nature 191 [4794], 1161 [1961]).

Paper chromatogram in the system n-butanol+methanol+water (4:1:2): $Rf$=0.39 (bioautographed with *Staphylococcus aureus*).

For the conversion of the thioureido compound into thiohydantoin the compound is dissolved in 210 ml. of glacial acetic acid and allowed to stand for 48 hours at 20° C. in the dark. The glacial acetic acid is then dispelled under 0.1 mm. pressure of mercury and the remaining glacial acetic acid removed by taking up the evaporation residue several times with mixtures of toluene and alcohol, and by re-evaporation. The crude thiohydantoin is purified by means of carbon. 8.4 grams of the substance are dissolved in 400 ml. of chloroform, treated with 4 grams of animal carbon, stirred for 10 minutes and filtered off. The evaporated filtrate (8.0 grams) is crystallized from a mixture of acetone and ether to yield 5.26 grams of crystalline 7-[4-(1-allyl-2-thiono-5-oxo-imidazolidin-4-yl)-butyryl] - amino - cephalosporanic acid of the formula

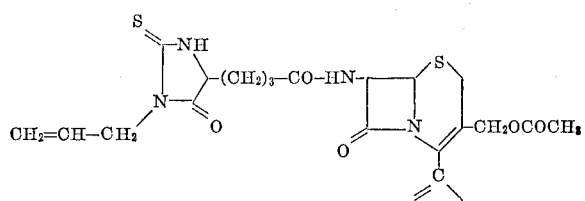

melting at 153–157° C. in the form of needles.

Ultraviolet absorption spectrum in alcohol: $\lambda_{max}$ 265 ($\epsilon$=18800). Infrared absorption in Nujol: bands inter alia at 3.02μ, 3.08μ, 5.61μ, 5.73μ, 6.02μ, 6.62μ, 7.05μ (shoulder), 7.39μ, 8.03μ, 8.12μ, 8.39μ, 8.50μ, 8.64μ, 8.82μ, 9.00μ, 9.37μ, 9.71μ, 9.98μ, 10.81μ, 11.25μ. Optical rotation: $[\alpha]_D^{20}$=+97.9°±1° (c.=1 in N sodium bicarbonate). Thin-layer chromatogram in silica gel in the system n-butanol+glacial acetic acid (10:1) saturated with water: $Rf$=0.39. Paper chromatogram in the system n-butanol+methanol+water (4:1:2): $Rf$=0.66.

What is claimed is:

1. A member selected from the group consisting of 7-[4-(1-allyl-2-thiono-5-oxo-imidazolidine-4-yl)-butyryl]-amino-cephalosporanic acid and its therapeutically acceptable salts with organic tertiary nitrogen bases or metals.

2. A member selected from the group consisting of 7-[4-(1-lower alkenyl-2-thiono-5-oxo-imidazolidine - 4 - yl)-butyryl]-amino-cephalosporanic acid and its thereapeutically acceptable salts with organic tertiary nitrogen bases or metals.

3. N-(N'-lower alkenyl-thiocarbamoyl)-cephalosporin C.

4. N-(N'-allyl-thiocarbamoyl)-cephalosporin C.

References Cited by the Examiner

UNITED STATES PATENTS 3,227,712  1/1966  Patchette et al. _____ 260—243

NICHOLAS S. RIZZO, *Primary Examiner.*

HENRY R. JILES, *Examiner.*

JAMES W. ADAMS, JR., *Assistant Examiner.*